E. SEAVEY.
FILTER.
APPLICATION FILED FEB. 3, 1914.
1,197,403.
Patented Sept. 5, 1916.
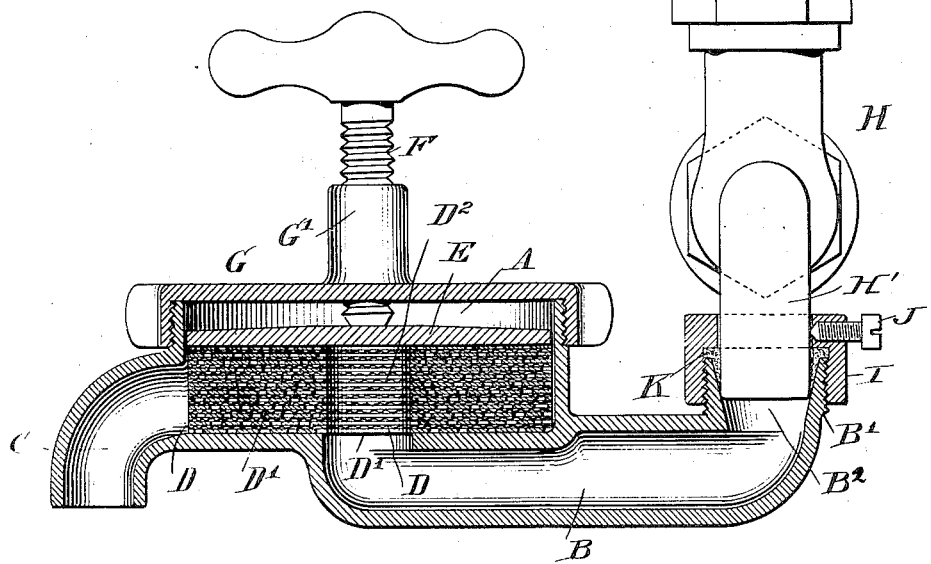
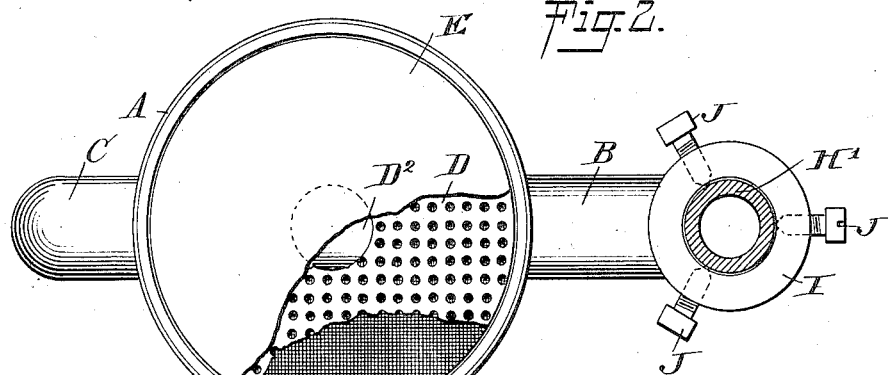
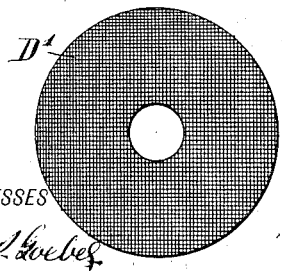
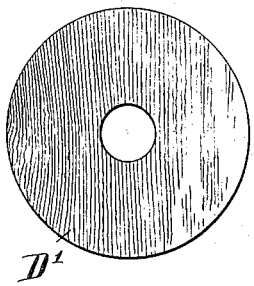
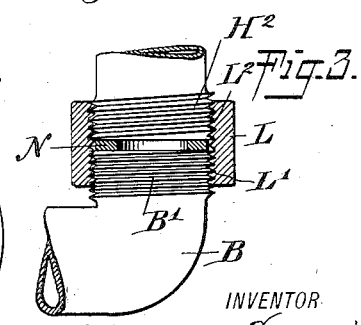
WITNESSES
William L. Goebel
Geo. J. Hooker
INVENTOR
Eugene Seavey
BY Munn & Co
ATTORNEYS

UNITED STATES PATENT OFFICE.

EUGENE SEAVEY, OF NEW YORK, N. Y.

FILTER.

1,197,403.　　　Specification of Letters Patent.　　Patented Sept. 5, 1916.

Application filed February 3, 1914. Serial No. 816,195.

*To all whom it may concern:*

Be it known that I, EUGENE SEAVEY, a citizen of the United States, and a resident of the city of New York, borough of Manhattan, in the county and State of New York, have invented a new and Improved Filter, of which the following is a full, clear, and exact description.

The invention relates to filters, such as shown and described in the Letters Patent of the United States No. 1,061,928, granted to me on May 13, 1913.

The object of the present invention is to provide a new and improved filter more especially designed for household use and arranged to permit convenient attachment to or removal from the spout of a faucet, to insure thorough purifying of the liquid to be filtered, and to retain the sediment or other extraneous matter contained in the liquid.

In order to accomplish the desired result use is made of a casing containing a filtering medium and provided with a removable cover, the casing having an integral inlet and an integral outlet, and a coupling for fastening the said integral inlet to the discharge spout of a faucet. Use is also made of fiber disks impregnated or saturated with carbon and arranged alternately with perforated metal disks to form the filtering medium.

A practical embodiment of the invention is represented in the accompanying drawings forming a part of this specification, in which similar characters of reference indicate corresponding parts in all the views.

Figure 1 is a sectional side elevation of the filter as applied to a faucet having a smooth or non-threaded discharge spout; Fig. 2 is a plan view of the same with parts broken out and the faucet spout shown in section; Fig. 3 is a sectional side elevation of a modified form of the coupling as applied for connecting the inlet of the filter with the threaded discharge spout of a faucet; Fig. 4 is a plan view of one of the fiber disks made from a textile fabric impregnated with carbon; and Fig. 5 is a like view of one of the fiber disks made from a thin sheet of wood impregnated or saturated with carbon.

The casing A of the filter is provided at its bottom with a central inlet B and at one side with an integral outlet C in the form of a spout. Within the casing A is arranged a filtering medium in the form of a stack of alternately-arranged disks D and D', of which the disks D are perforate spring metal disks, curved and capable of flattening on the application of pressure, and capable of returning to curved shape on release of pressure, as more fully explained in the United States patent above referred to. The disks D' are made of fiber and are impregnated or saturated with carbon. As shown in Fig. 4, the disks D' are made of a closely woven textile fabric, saturated or impregnated with carbon, while the disk shown in Fig. 5 is made of a thin piece of wood, saturated or impregnated with carbon. The disks D and D' are provided with central openings $D^2$ in register with each other and with the inlet B, as plainly indicated in the drawings. The lowermost disk D' rests on the bottom of the casing A and the uppermost disk of the stack is engaged by a presser plate E for pressing the stack of disks, so that the normally curved or arched disks D are flattened out, and the disks D, D' are firmly superimposed one upon the other. When the pressure of the presser plate E is released the metal disks D by their own resiliency return to curved or arched position thus practically separating the disks D, D' for conveniently cleaning the same without removing the filtering medium from the casing A. The presser plate E is engaged at the top by a screw rod F screwing in a nut G' formed integrally on the top of a cover G, screwed or otherwise secured on the casing A to close the open top thereof.

In order to attach the inlet B to the smooth or non-threaded spout H' of a faucet H, the following arrangement is made: The inlet B is in the form of a pipe extending integrally from the center of the bottom of the casing A to and beyond the side of the casing A directly opposite the outlet C, and the outer end of the inlet B is provided with an upwardly extending threaded offset B' on which screws a coupling I through which extends the spout H' onto a conical seat $B^2$ formed interiorly on the offset B'. Set screws J screw in the coupling I and engage the spout H' so as to fasten the coupling and consequently the filter in position on the faucet H. In order to prevent leakage use is made of a packing K arranged within the coupling I and surrounding the spout H' so that when the coupling I is screwed up on the threaded offset B' the packing K is compressed and packed firmly around the spout H' to prevent leakage of the water at the coupling.

It is understood that when the faucet H is opened the water or other liquid flows by way of the spout H' into and through the inlet B to pass into the opening $D^2$ of the filtering medium, from which the water can filter through the disks D' and from one to the other by way of the perforations in the disks D, the liquid finally passing into the outlet spout C. It will be noticed that by having the disks D' impregnated or saturated with carbon the water is purified and rendered sweet.

When it is desired to clean the filter it is only necessary for the operator to retract the screw rod F so that the disks D return from their flattened position by their own resiliency into curved position to separate the disks D and D' as previously explained. On opening the faucet H the water flows through the filter and carries along any sediment or extraneous matter previously retained by the disks D and D'. After the disks have been cleaned, the supply of water is shut off by the faucet H and the screw rod F is screwed down again to cause the presser plate E to press the filtering medium back into filtering position, as previously stated.

When it is desired to attach the filter to a faucet H having a threaded outlet spout $H^2$, as shown in Fig. 3, then a coupling L is employed, provided with threads L', $L^2$ of different pitch, and of which the thread L' screws on the threaded offset B' and the thread $L^2$ screws on the threaded spout $H^2$. A packing N is contained within the coupling L and interposed between the opposite faces of the offset B' and the spout $H^2$ to prevent leakage. It is understood that in connecting the inlet B with the spout $H^2$ the coupling L is first screwed onto the offset B' and then screwed onto the spout $H^2$, and when a final position is reached a further turn given to the coupling L causes the latter to bind on the threads of the spout $H^2$, thus securely holding the filter in position on the outlet spout of the faucet H.

Having thus described my invention, I claim as new and desire to secure by Letters Patent:

As an article of manufacture, a filter disk of a closely woven textile fabric saturated with carbon.

In testimony whereof I have signed my name to this specification in the presence of two subscribing witnesses.

EUGENE SEAVEY.

Witnesses:
 THEO. G. HOSTER,
 GEORGE H. EMSLIE.